(12) United States Patent
Fajardo et al.

(10) Patent No.: US 6,444,133 B1
(45) Date of Patent: Sep. 3, 2002

(54) METHOD OF MAKING PHOTONIC BAND GAP FIBERS

(75) Inventors: James C. Fajardo, Painted Post; Thomas A. Cook; Michael T. Gallagher, both of Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/563,390

(22) Filed: Apr. 28, 2000

(51) Int. Cl.[7] .......................................... C03B 37/012
(52) U.S. Cl. .............................. 216/24; 216/56; 216/97; 65/393; 65/401; 65/409; 65/411; 65/429
(58) Field of Search ........................ 65/393, 401, 409, 65/411, 429; 216/24, 56, 97

(56) References Cited

U.S. PATENT DOCUMENTS

| | | | |
|---|---|---|---|
| 4,294,271 A | 10/1981 | Intrater et al. | 134/113 |
| 4,810,276 A * | 3/1989 | Gilliland | 65/3.12 |
| 4,853,020 A * | 8/1989 | Sink | 65/4.1 |
| 5,154,745 A * | 10/1992 | Le Sergent | 65/3.12 |
| 5,372,653 A | 12/1994 | Gray | 134/26 |
| 5,553,179 A | 9/1996 | Cryan et al. | 385/43 |
| 5,656,056 A * | 8/1997 | Braglia et al. | 65/382 |
| 5,676,724 A * | 10/1997 | Barre et al. | 65/382 |
| 5,774,779 A | 6/1998 | Tuchinkskiy | 419/2 |
| 5,802,236 A | 9/1998 | DiGiovanni et al. | 382/127 |
| 5,897,679 A * | 4/1999 | Anderson et al. | 65/382 |
| 5,907,652 A | 5/1999 | DiGiovanni et al. | 385/125 |
| 6,260,388 B1 * | 7/2001 | Borrelli et al. | 65/393 |
| 6,301,420 B1 * | 10/2001 | Greenaway et al. | 385/126 |

FOREIGN PATENT DOCUMENTS

| | | | |
|---|---|---|---|
| WO | WO 99/64903 | 12/1999 | G02B/6/00 |
| WO | WO 99/64904 | * 12/1999 | G02B/6/12 |

OTHER PUBLICATIONS

Knight, J.C. et al "All–silica single–mode optical fiber with photonic crystal cladding" Optics Letters 21 (19), Oct. 1, 1996, pp 1547–9.*

Brechet, F. et al "Single–mode propaggation into depressed –core–index photonic–bandgap fibre designed for zero–dispersion propagation at short wavelengths" Electronics Letter, Mar. 16, 2000, 36 (6) 514–515.*

Barkou, S.E. et al "Photonic bandgap filters" 1999 IEEE Annual Meeting Conference Proceedings. LEOS '99, Nov. 1999, vol. 2, pp. 615–616.*

"Single–Mode Photonic Band Gap Guidance of Light in Air" by R.F. Cregan et al, Science, vol. 285, pp. 1537–1539, Sep. 3, 1999.

* cited by examiner

Primary Examiner—Anita Alanko
(74) Attorney, Agent, or Firm—Eric M. Smith

(57) ABSTRACT

A method is provided for making a photonic band gap fiber including the steps of etching a preform and then drawing the preform into a photonic band gap fiber. Glass tubes are bundled and then formed into a photonic crystal perform having a number of passageways by reducing the cross-section of the bundle. One of the passageways is enlarged by flowing an etchant through it. After cleaning, the band gap fiber is made from the etched photonic preform, for example, by drawing.

9 Claims, 7 Drawing Sheets

FIG. 7 HOLE DIAMETER VS ETCHING TIME

METHOD OF MAKING PHOTONIC BAND GAP FIBERS

BACKGROUND OF THE INVENTION

1. Field of the Invention

The present invention relates generally to photonic band gap fibers, and particularly to a method of making photonic band gap fibers.

2. Technical Background

Traditionally optical waveguide fibers have used total internal reflection to guide the propagation of an optical signal. Optical waveguide fibers that rely upon total internal reflection for the transmission of optical signals typically have a core region and a cladding region. The core region is the portion of the optical waveguide fiber that the optical signal propagates within. Generally, the core region of an optical waveguide fiber relying on total internal reflection to guide the propagation of an optical signal has a higher index of refraction than surrounding cladding region.

Optical waveguide fibers that rely upon total internal reflection in order to guide the propagation of optical signals have of inherent limitations. Among these are relatively high dispersion and attenuation of the optical signal, and relatively low upper limits on the power of the optical signal.

Photonic band gap (PBG) fibers are photonic crystals that have a structure in which the refractive index varies periodically in 2 dimensions, (the x-y plane, where the z-coordinate is the longitudinal axis of the fiber), with a period of the order of an optical wavelength. Photonic band gap fibers may offer a better performance than total internal reflection optical waveguide fibers with regard to dispersion, attenuation and signal power.

A photonic crystal is a structure having a periodic variation in dielectric constant. The periodic structure of the crystal may be one, two or three-dimensional. A photonic crystal allows light of certain wavelengths to pass through it and prevents the passage of light having certain other wavelengths. Thus photonic crystals are said to have allowed light wavelength bands and band gaps that define the wavelength bands that are excluded from the crystal. A review of the structure and function of photonic crystals is found in, Joannopoulus et al., "Photonic Crystals: putting a new twist on light", *Nature* vol. 386, Mar. 13, 1997, pp. 143–149.

A two-dimensional photonic crystal having certain geometries and effective indices of refraction may produce a photonic band gap fiber in which the optical signal propagates in either air or vacuum. Use of a 2 dimensional photonic crystal as an optical fiber is discussed in, Birks et al., "Full 2-D photonic band gaps in silica/air structures", *Electronic Letters*, Vol. 31 (22), Oct. 26, 1995, pp. 1941–1943. Through Bragg diffraction, these structures can support a series of optical resonances, band gaps and allowed states.

An optical waveguide fiber in which the optical signal propagates in air or vacuum is of great interest in the field of telecommunications. This interest arises because optical waveguide fibers in which the optical signal propagates in air or vacuum offer lower dispersion, lower attenuation of the optical signal being carried and have a near zero non-linear refractive index. Compared to air guiding photonic band gap fibers, current total internal reflection fibers have a limited operating regime.

Recent theoretical work has indicated that large void-filling fractions are required for optical waveguide fibers to propagate light in a low index of refraction core utilizing the photonic band gap effect. The low index of refraction core typically includes an evacuated or air filled passageway in which the light is guided. The void-filling fraction is a function of the ratio of the diameter of the passageways to the center to center spacing, or pitch, of the passageways. Equation 1 is the mathematical expression for the void-filling fraction of a photonic band gap fiber, vf.

$$vf = \frac{\pi}{2\sqrt{3}} \left[\frac{d}{\Lambda}\right]^2 \quad (1)$$

where
  vf is the void-filling fraction;
  d is the diameter of internal passageways; and
  $\Lambda$ is the distance between the centers of adjacent passageways or pitch.

Photonic band gap air-guiding fibers with a void-filling fraction of 0.42 have been fabricated using a stack and draw process. A detailed description of the stack and draw process may be found in R. F. Cregan, Single-Mode Photonic Band Gap Guidance of Light in Air, SCIENCE, vol. 285, pp. 1537–39 (1999).

Optical waveguide fibers having large void-filling fractions are obtained by drawing photonic crystal preforms having large void-filling fractions into optical waveguide fibers using conventional optical waveguide fiber making techniques.

Photonic crystal preforms have been made using the stack and draw method and the extrusion method. The stack and draw method involves arranging glass capillary tubes into an array having desirable macroscopic cross-sectional properties and then reducing the cross section of the preform. Typically the preform is either forced through a die or drawn to reduce the cross section. Preforms made according to the stack and draw process are categorized as either close-packed arrays or non-closepacked arrays. A close-packed array is an array of capillary tubes where the capillary tubes support one another. A non-close-packed array is an array of capillary tube wherein spacers or jigs are placed in the array thus spacing the walls of the capillary tubes apart.

Making optical waveguide fibers with a high void-filling fraction with a small pitch is difficult.

There is a need for a method of making preforms for making photonic band gap fibers that is repeatable, versatile, and adaptable to a manufacturing environment.

SUMMARY OF THE INVENTION

One aspect of the present invention is a method for making photonic band gap fibers including the step of making a photonic crystal preform having multiple longitudinal passageways. The photonic crystal preform is then etched and drawn into a photonic band gap fiber. In another aspect, the present invention includes an apparatus for etching a preform having a plurality of passageways. The apparatus includes a reservoir containing an etching agent. A heater is thermally coupled to the reservoir. A circulator having an input line and an delivery line is located so that the input line is connected to the reservoir and circulator draws etching from the reservoir and directs it to a nozzle connected to the delivery line of the circulator. The etching agent is directed by the nozzle into the passageways of the preform. The apparatus also includes a receptacle located to collect the etching agent as it exits the passageways. A return line is connected to the receptacle, and the etching agent flows through the return line and is returned to the reservoir.

In another aspect, the present invention includes a method for making photonic band gap fibers includes the steps of first assembling a number of glass tubes into a bundle. The bundle is then formed into a photonic crystal preform having a number of passageways by reducing the cross-section of the bundle. Next, one of the passageways of the photonic crystal preform is enlarged by flowing an etching agent through it. After a predetermined time has passed, the flow of the etching agent is stopped. After the etching agent is stopped flowing through the passageway, the photonic crystal preform is cleaned to remove any remaining liquid etching agent. A photonic band gap fiber is then made from the etched photonic preform. Typically, the photonic band gap fiber is made from the preform by traditional fiber drawing methods.

An advantage of the present invention is that preforms can be made which result in void-filling fractions on the order of 0.82 and greater.

Another advantage of one embodiment of the present invention is that special jigs are not required to make a preform having a large void-filling fraction.

Another advantage of the present invention is that it provides a relatively easy way to insert a large passageway in the structure of the preform and hence the resulting photonic band gap fiber. This follows from the observation that in an interior passageway or channel any surface with a positive radius of curvature, with respect to the wall of the passageway, e.g., a protrusion from the wall surface, has a greater etch rate than a flat surface. Furthermore, the etch rate of a flat surface is greater than that of a surface having negative curvature, e.g., a depression. Therefore, instead of making a preform with a large central passageway, a task that has proven difficult, a smaller passageway possessing wall of opposite curvature from the remaining passageways may be created in the preform. When the passageways are simultaneously exposed to an etching agent the desired cross-sectional shape of the passageway is realized while the void-filling fraction of the remaining passageways increases.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 6:
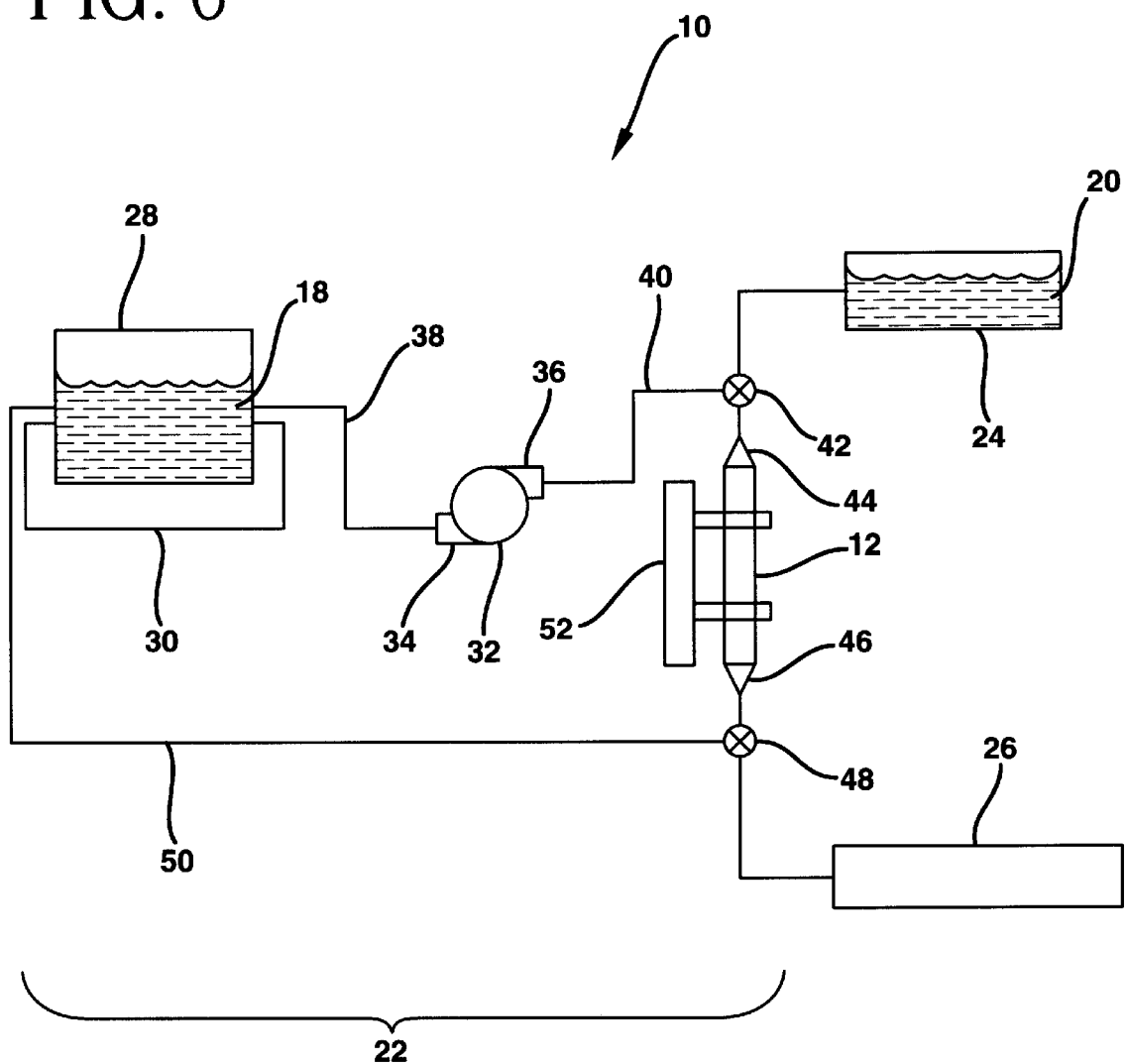
FIG. 6 is a diagrammatic depiction of an apparatus in which the present invention is embodied.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the apparatus for etching a photonic crystal preform, of the present invention is shown in FIG. 6, and is designated generally throughout by reference numeral 10.

Figure 2:
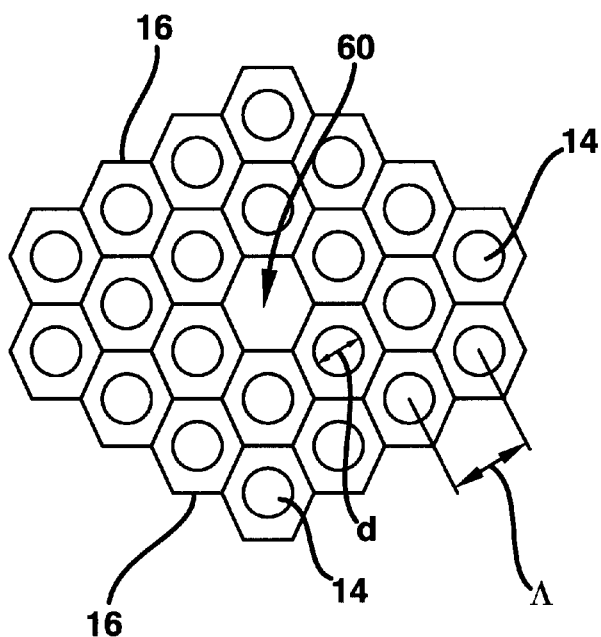
FIG. 2 is a cross-section taken through the preform before etching.
Figure 4:
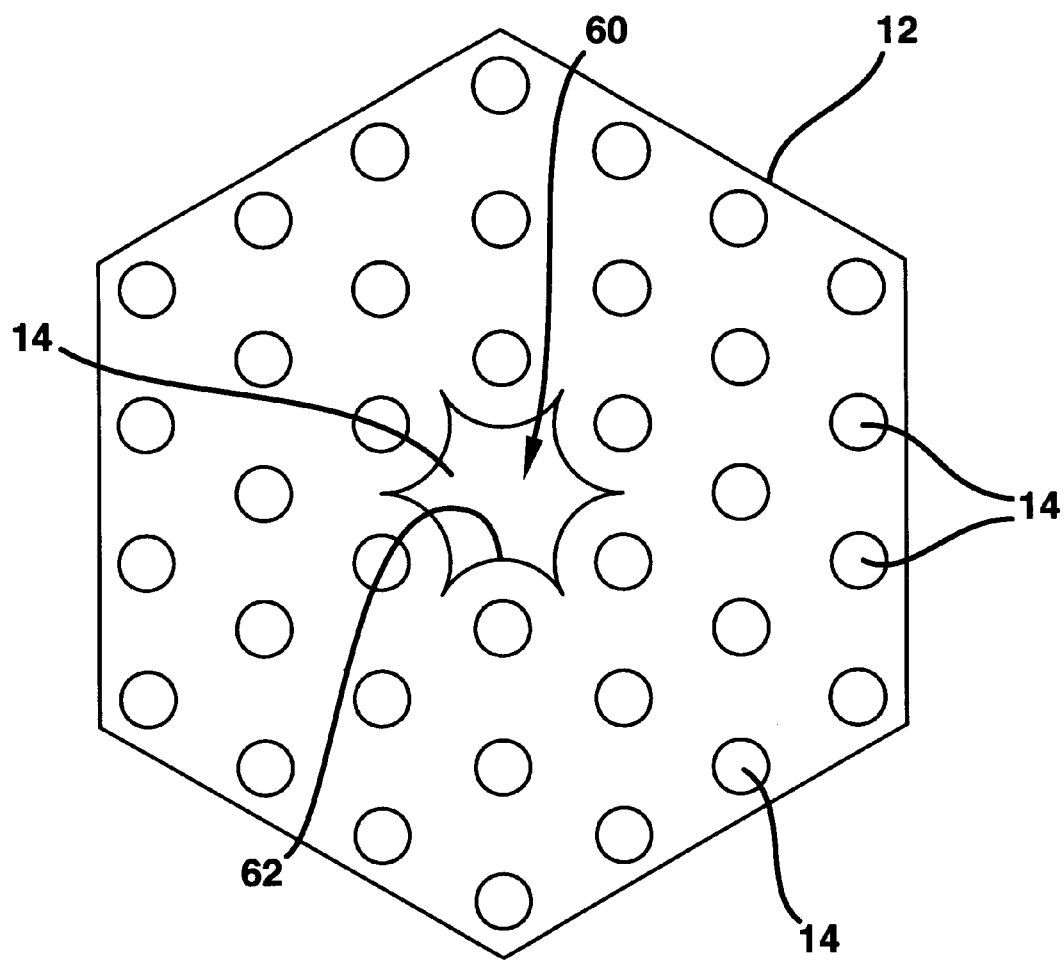
FIG. 4 is a cross-section taken through the preform before etching.

The present invention is directed to making photonic band gap fibers by etching a preform 12. The etching of the preform 12 allows the preform 12 and thus the photonic band gap fiber made from it to have much larger void-filling fractions than are available with other photonic band gap fiber manufacturing techniques. FIGS. 2 and 4 are illustrative of possible partial cross-sections of the preform 12.

The preform 12 is typically an elongated glass body having a number of parallel internal passageways 14 running the length of the preform 12. The glass chosen for the preform 12 should have a high index of refraction. Examples of glasses that the preform may be made from are silica glasses, lead silicate glasses, germanium silicate glasses, emanate glasses, fluoride glasses and phosphate glasses. The preform 12 may be made in a number of ways including, for example, extruding a multicellular glass body and assembling capillary tubes 16 into multicell structures. The structure of the preform 12 depends upon the index of refraction of the selected glass and the wavelengths of the optical signals to be carried by the resulting photonic band gap fiber.

The preform 12 will have a lattice structure of internal passageways 14 having a certain diameter d and pitch a. Preferably the diameter d and pitch A of the internal passageways 14 are substantially uniform throughout the preform 12.

Figure 1:
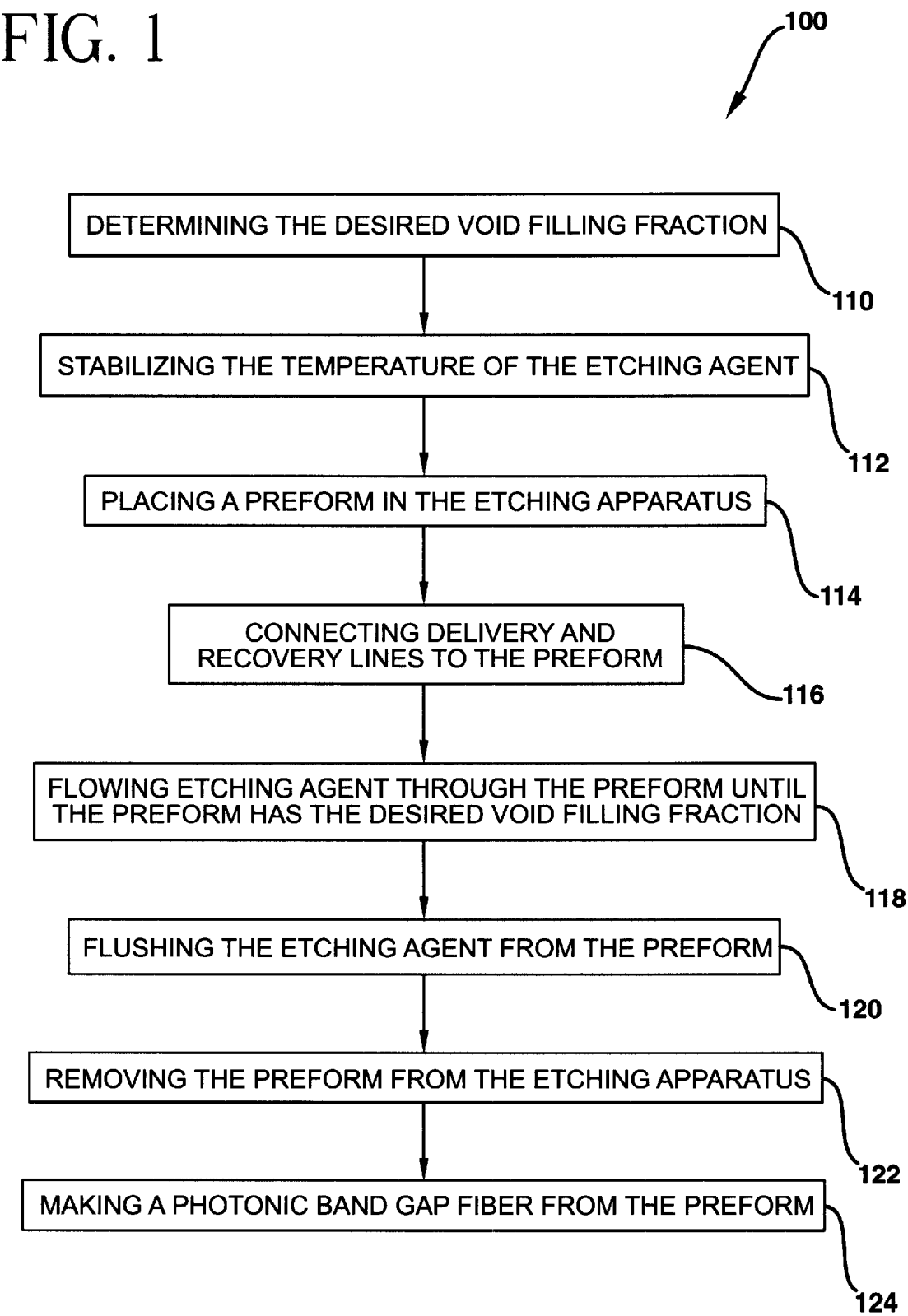
FIG. 1 is a diagrammatic depiction of a process in which the present invention is embodied.

FIG. 1 depicts an embodiment of a method 100 for making a photonic band gap fiber. The method 100 embodiment of the present invention will be described with reference to the apparatus 10 embodiment of the present invention depicted in FIG. 6.

The method 100 includes the step 110 of determining the desired void-filling fraction for the etched preform 12. The void-filling fraction is determined by the specific photonic band gap effects to be exhibited by the resulting photonic band gap fiber.

The method 100 of the present invention further includes the step 112 of stabilizing the temperature of the etching agent 18. The stabilization temperature of the etching agent 18 depends upon the etching agent 18 and the composition of the preform 12. For example, a heater 30 is used to stabilize the temperature of the etching agent 18 at about 58° C. when the etching agent 18 is $NH_4F.HF$.

The method 100 of the present invention also includes the step 114 of placing the preform in an etching apparatus 10. An example of an etching apparatus in which the present invention is embodied is shown in FIG. 6 and described in detail below.

The method 100 further includes the step 116 of connecting delivery and recovery lines 40, 50 to the preform 12. FIG. 6 depicts an etching apparatus 10 in which the delivery line 40 in connected to a nozzle 44 and the recovery line 50 is attached to a receptacle 46. The nozzle 44 and receptacle 46 are connected to opposite ends of the preform 12.

The method 100 further includes the step 118 of flowing etching agent 18 through the internal passageways 14 of the preform 12 until the preform 12 has a desired void-filling fraction. Once the preform has the desired void-filling fraction and the flow of etching agent 18 through the preform is stopped.

The method 100 further includes the step 120 of flushing the etching agent 18 from the preform 12. For example, a flushing agent 20, such as water, is flowed through the internal passageways 14 of the perform 12 to remove any residual etching agent 18 and arrest the etching process.

In the next step 122 of the illustrated method 100, the preform 12 is removed from the etching apparatus 10. Finally, the preform 12 is made into an optical waveguide fiber using techniques known to those skilled in the art of making optical waveguide fibers from preforms. This is shown as step 124 in FIG. 1.

FIG. 2 shows a partial cross-section of a preform 12 made from hexagonal capillary tubes 16 prior to the etching step 118 of the method 100 illustrated in FIG. 1. A void 60 is formed by the omission of the single hexagonal capillary tube 16. The void 60 becomes a light guiding region in the photonic band gap fiber produced in step 124.

Figure 3:
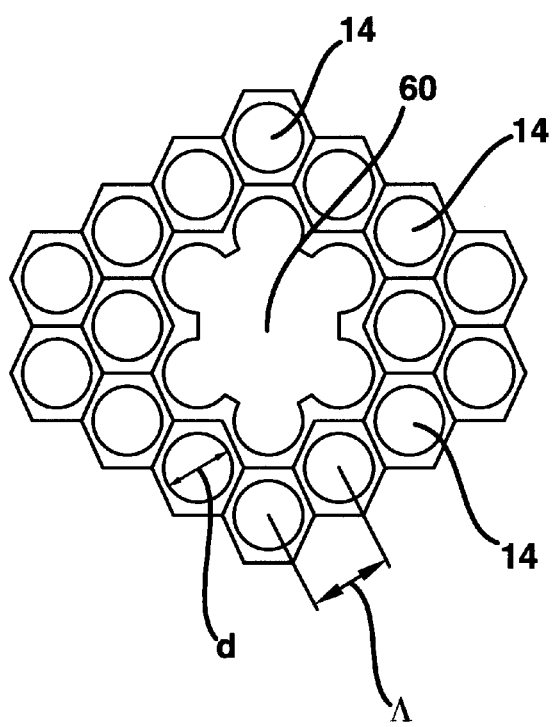
FIG. 3 is a cross-sectional view of the preform shown in FIG. 2 after etching

FIG. 3 shows the same partial cross-section after the etching step 118 of the method 100. The shape of the void 60 is a result of the difference in etching rates of surfaces having different curvatures.

FIG. 4 shows a partial cross-section of a preform 12 made by an extrusion process prior to the etching step 118 of the method embodiment 100 of the present invention described above. The preform has a void 60 having regions of negative curvature 62. This void 60 will become a light guiding region in the photonic band gap fiber produced in step 124.

Figure 5:
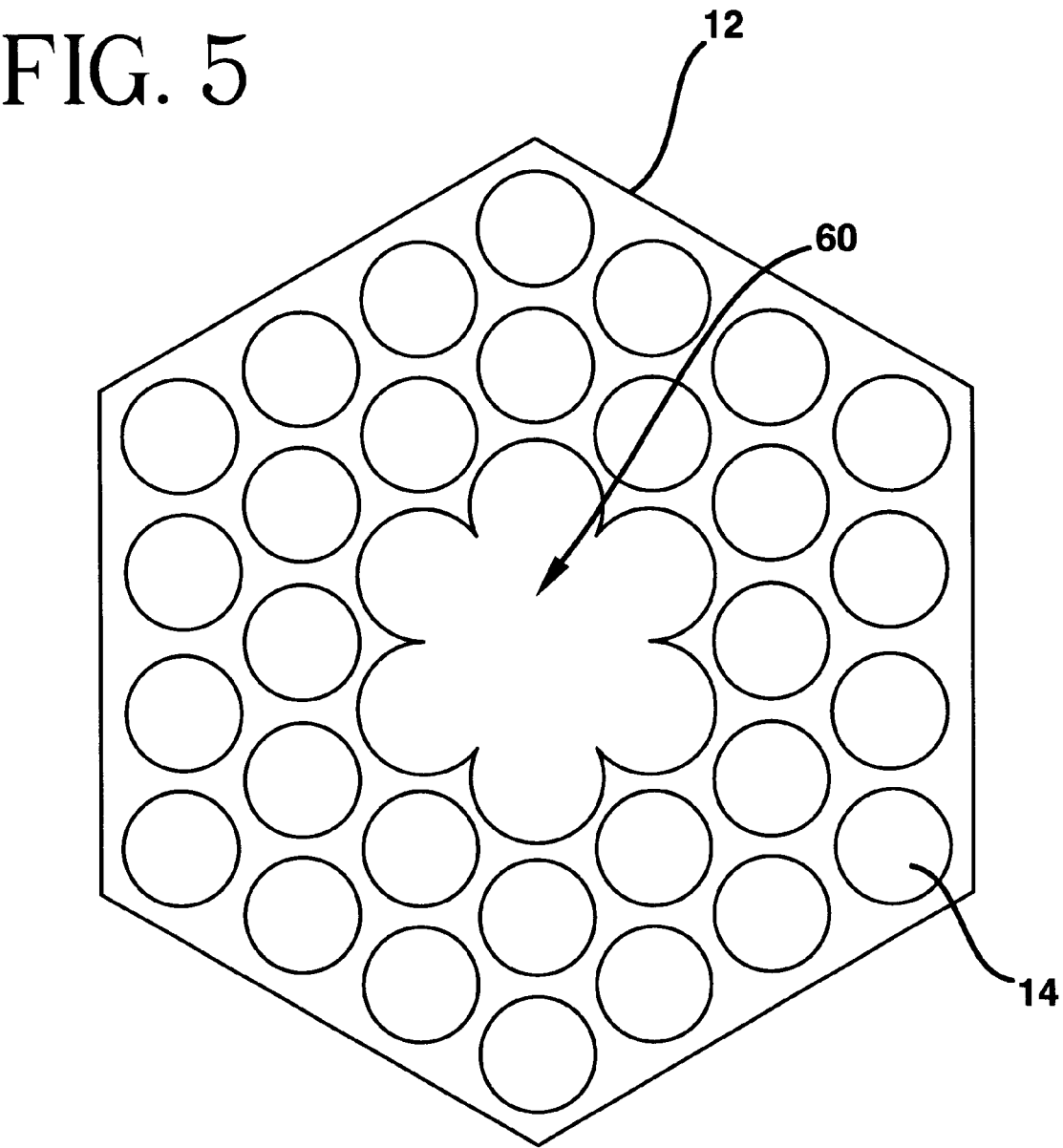
FIG. 5 is a cross-sectional view of the preform shown in FIG. 4 after etching.

FIG. 5 shows the same partial cross-section after the etching step 118. The shape of the void 60 has changed as a result of the difference in etching rates of surfaces having different curvatures.

In an additional embodiment of the invention, as embodied herein and as shown in FIG. 6, the present invention includes an etching apparatus 10 for etching the internal passageways 14 of a preform 12. The etching apparatus 10 includes a substantially closed loop delivery circuit 22 for passing an etching agent 18 through at least some of the internal passageways 14 of the preform 12. The etching apparatus 10 also includes delivery and recovery systems 24, 26 for the flushing agent 20. The flushing agent 20 delivery system 24 provides a flushing agent 20 to the preform 12. The flushing agent 20 flows through the preform 12 and removes residual etching agent 18 after the etching of the preform 12 is completed. An example of a typical flushing agent 20 is water.

The etching apparatus 10 includes a reservoir 28 for holding an etching agent 18. In this embodiment, the etching agent 18 is chosen to remove material from the internal passageways 14 of the preform 12 in an efficient and predictable manner. Typically the etching agent 18 is an acid; examples of acids suitable for use with a preform 12 made of silica glass include HF and $NH_4F.HF$. The etching agent 18 selected for use with a particular preform 12 depends on chemical composition of the preform 12 to be etched. Those of ordinary skill in the art of etching glass may readily select a particular etching agent 18 for a preform 12 having a specific glass composition.

The reservoir 28 may be a commercially available reservoir for handling corrosive materials. Such reservoirs are commercially available. An example of such a reservoir 28 is a nalgene container.

The reservoir 28 is thermally coupled to a heater 30. The heater 30 thermally stabilizes the etching agent 18 at a preselected temperature. The heater 30 may be, for example, a heat sink bath that surrounds a portion of the reservoir 28. Such heat sink baths may be assembled from commercially available components. Examples of commercially available components that may be combined to form a heat sink bath are a CT 050 pump marketed by Schott Gerate and a GP-100 bath temperature controller available from Neslab Instruments, Portsmouth, NH. In one embodiment when Ammonium Bifluoride ($NH_4F.HF$) is used as the etching agent 18 and the preform 12 is made from silica glass the heater 30 maintains the etching agent 18 at a temperature of about 58° C.

The etching apparatus 10 further includes a circulator 32. The circulator 32 includes an intake port 34 and an output port 36. The input port 34 is connected to the reservoir 28 by an input line 38. The circulator 32 draws etching agent 18 from the reservoir 28 through the input line 38. Preferably the input line 38 is made of a material resistant to the corrosive effects of the etching agent 18. Etching agent 18 entering the intake port 34 exits the circulator 32 through an output port 36. The circulator 32 increases the dynamic pressure of the etching agent 18 so that the etching agent 18 may be circulated through the delivery circuit 22. The output port 36 of the circulator is connected to a delivery line 40. The other terminus of the delivery line 40 is connected to a valve 42.

The valve 42 is configured to regulate the flow of etching agent 18 through the perform 12. Preferably the delivery system 36 for the flushing agent 20 is also connected to the valve 42 and the valve 42 is configured to have at least three settings. The first setting directs etching agent 18 coming from the circulator 32 to a nozzle 44. The second setting directs flushing agent 20 to the nozzle 44 and the third setting blocks both etching agent 18 and flushing agent 20 from entering the nozzle 44.

The nozzle 44 engages one end of the preform 12 and is configured to direct any material flowing through it into the internal passageways 14 of the preform 12. Using techniques known to those skilled in the art the nozzle may be configured to direct etching agent 18 and flushing agent 20 to all or some of the internal passageways 14 of the preform 12. Preferably the nozzle 44 engages the preform 12 in such a manner as to preclude the etching agent 18 from acting on the external surface of the preform 12.

Preferably the preform 12 is secured in near vertical position throughout the etching process by a support 46.

A receptacle 46 engages the other end of the preform 12. The receptacle 46 is configured to collect etching agent 18 and flushing agent 20 and direct the flow of such agents to a directional valve 48. The directional valve 48 has at least two setting. When the receptacle 46 is collecting etching agent 18 the directional valve 48 is configured to direct the etching agent 18 into a return line 50. The etching agent 18 flows through the return line 50 and is reintroduced into the reservoir 28. When the receptacle 46 is collecting flushing agent 20 the directional valve 48 is configured to direct the flushing agent 18 into the recovery system 42 for the flushing agent 20.

As described above the period of time that the etching agent 18 circulates through the preform 12 is determined by the pre-etch dimensions of the internal passageways 14 and the desired post-etching void-filling fraction of the preform.

Figure 7:
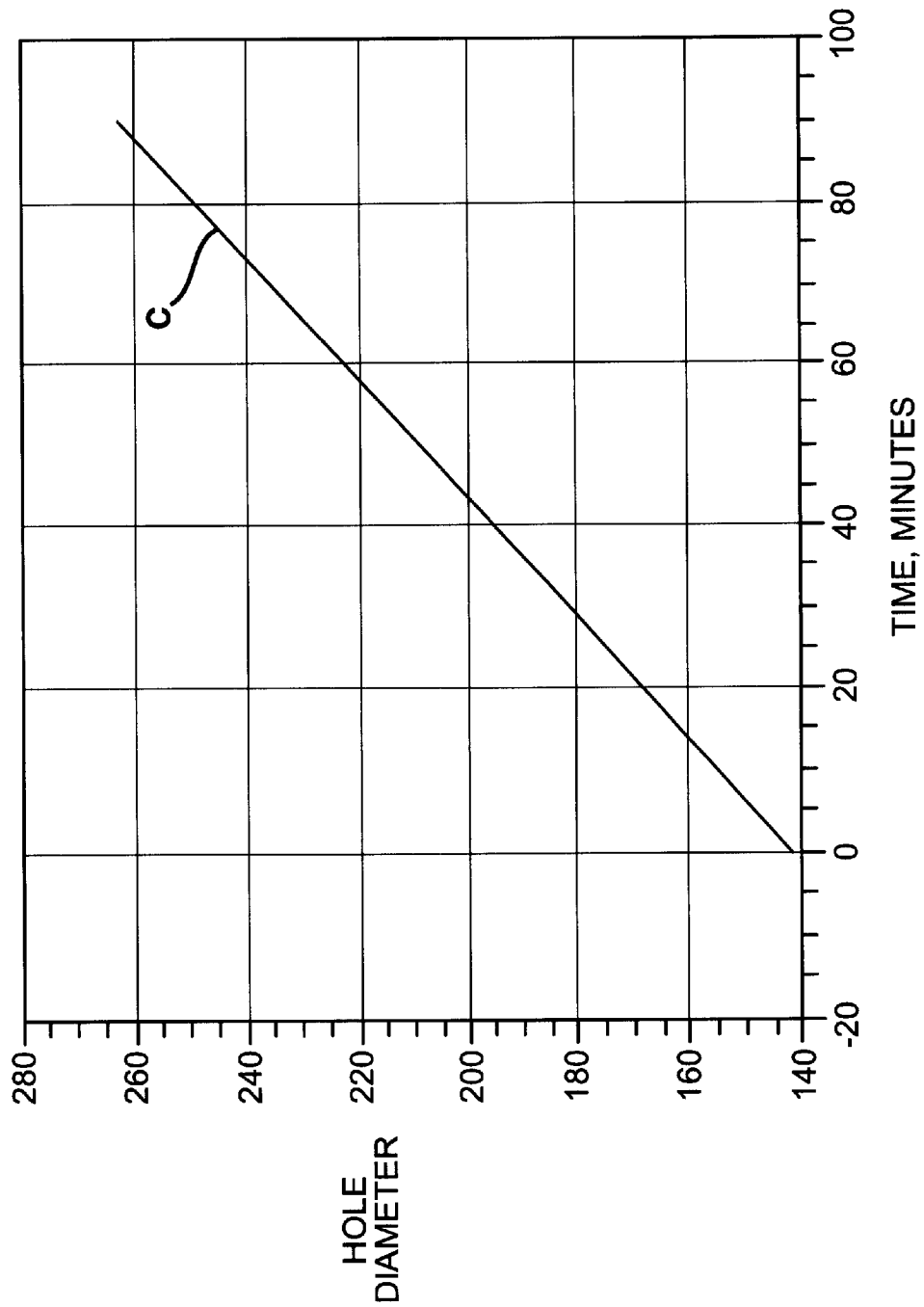
FIG. 7 is a chart showing the relationship between material removal and exposure to the etching agent.

FIG. 7 is an example of a chart that may be used to determine the etching period. The chart of FIG. 7 is used by determining the desired post-etch diameter of the internal passageways 14 and finding that value on the vertical axis. A horizontal line is drawn from that value until it intersects the line c. The corresponding time is then read from the horizontal axis.

Construction of such charts as shown in FIG. 7 is well known to those skilled in the art of etching glass. These charts may be constructed using mathematical models of the effect of etching agent 18 on a specific material. Such charts may also be constructed using empirical data gathered from etching preforms 12 having a specific glass composition and internal passageways 14 with a diameter d and a specific etching agent 18.

Figure 8:
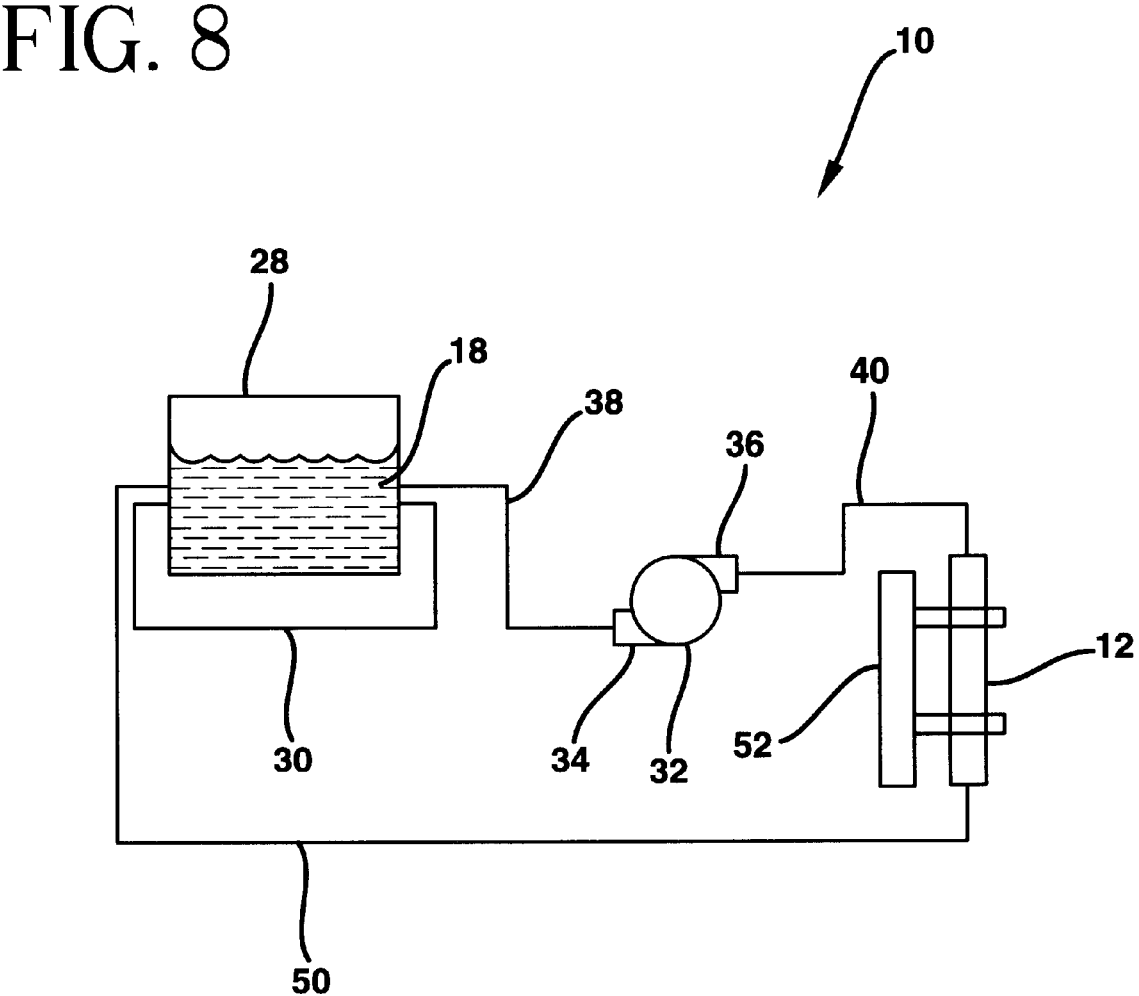
FIG. 8 is a diagramaitc depiction of an apparatus in whch the present invention is embodied.

With reference now to FIG. 8, an alternate embodiment of an etching apparatus 11 embodiment of the present invention is shown.

The etching apparatus 11 is a substantially closed loop delivery circuit for passing an etching agent 18 through at least some of the internal passageways 14 of the preform 12.

The etching apparatus 11 includes a reservoir 28 for holding an etching agent 18. In this embodiment, the etching agent 18 is chosen to remove material from the internal passageways of the preform 12 in an efficient and predictable manner. The etching agent 18 may be an acid; examples of acids suitable for use with a preform 12 made of silica glass include HF and $NH_4F.HF$. The etching agent 18 selected for use with a particular preform 12 depends on chemical composition of the preform 12 to be etched. Those of ordinary skill in the art of etching glass may readily select a particular etching agent 18 for a preform 12 having a specific glass composition. The reservoir 28 is thermally coupled to a heater 30. The heater 30 maintains the etching agent 18 in thermally equilibrium. The heater 30 may be a heat sink bath, as described above in connection with the etching apparatus 10 embodiment depicted in FIG. 6, that surrounds a portion of the reservoir 28. When $NH_4F.HF$ is used as the etching agent 18 and the preform 12 is made from silica glass the heater 30 maintains the etching agent 18 at a temperature of about 58° C.

The etching apparatus 10 further includes a circulator 32. The circulator 32 includes an intake port 34 and an output port 36. The intake port 34 is connected to the reservoir 28 by an input line 38. The circulator 32 draws etching agent 18 from the reservoir 28 through the input line 38. Preferably the input line 38 is made of a material resistant to the corrosive effects of the etching agent 18. Etching agent 18 entering the intake port 34 exits the circulator 32 through an output port 36. The circulator 32 increases the dynamic pressure of the etching agent 18 so that the etching agent 18 may be circulated through the delivery circuit 52. The output port 36 of the circulator is connected to a delivery line 40. The other terminus of the delivery line 40 is connected to the perform 12.

The delivery line 40 engages one end of the preform 12 and is configured to direct the etching agent 18 into the internal passageways 14 of the preform 12. Preferably the delivery line 40 engages the preform 12 in such a manner as to preclude the etching agent 18 from acting on the external surface of the preform 12. Preferably the preform 12 is secured in near vertical position throughout the etching process by a support 46.

A return line 50 engages the other end of the preform 12. The etching agent 18 flows through the return line 50 and is reintroduced into the reservoir 28.

As described above the period of time that the etching agent 18 circulates through the preform 12 is determined by the pre-etch dimensions of the internal passageways 14 and the desired post-etching void-filling fraction of the preform.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for making photonic band gap fibers comprising the steps of:
   making a photonic crystal preform having a plurality of longitudinal passageways;
   etching the photonic crystal preform; and
   making a photonic band gap fiber from said etched photonic crystal preform.

2. The method of claim 1 wherein the step of etching the photonic crystal preform includes:
   flowing an etching agent through said plurality of longitudinal passageways; and
   enlarging said plurality of longitudinal passageways a predetermined amount by removing material from said plurality of longitudinal passageways.

3. The method of claim 1 wherein the step of making the photonic band gap fiber includes the step of:
   drawing said etched photonic crystal preform into a photonic band gap fiber.

4. The method of claim 1 wherein the step of making the photonic crystal preform includes the step of:
   extruding glass through a die.

5. The method of claim 4 wherein said glass is chosen from the group of glasses consisting of silica glasses, lead silicate glasses, germanium silicate glasses, germanate glasses, fluoride glasses and phosphate glasses.

6. The method of claim 1 wherein the step of making the photonic crystal preform includes the step of:
   placing a plurality of hollow core glass rods in a predetermined arrangement.

7. The method of claim 6 wherein each one of said plurality of hollow core glass rods is made from a glass chosen from the group of glasses consisting of silica glasses, lead silicate glasses, germanium silicate glasses, germanate glasses, fluoride glasses and phosphate glasses.

8. A method for making photonic band gap fibers comprising the steps of:
   assembling a plurality of glass tubes into a bundle having a cross-section;
   reducing the cross-section of said bundle, thereby forming a photonic crystal preform having a plurality of passageways;

flowing an etching agent through at least one of said plurality of passageways;

stopping the flow of said etching agent after a predetermined time period has elapsed;

cleaning said photonic crystal preform to remove said liquid etching agent; and making a photonic band gap fiber from said etched photonic crystal preform.

9. A method for making photonic band gap fibers comprising the steps of:

provided a photonic crystal preform having a plurality of longitudinal passageways;

etching the photonic crystal preform; and making a photonic band gap fiber from said etched photonic crystal preform.

* * * * *